United States Patent
Hirayama

(10) Patent No.: US 8,153,310 B2
(45) Date of Patent: Apr. 10, 2012

(54) ELECTRONIC APPARATUS SYSTEM

(75) Inventor: Tomohiro Hirayama, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 664 days.

(21) Appl. No.: 12/103,532

(22) Filed: Apr. 15, 2008

(65) Prior Publication Data

US 2008/0268313 A1 Oct. 30, 2008

(30) Foreign Application Priority Data

Apr. 27, 2007 (JP) ................... 2007-120099

(51) Int. Cl.
*H01M 8/04* (2006.01)
*H05K 7/20* (2006.01)

(52) U.S. Cl. .................. 429/410; 429/434; 361/697

(58) Field of Classification Search .............. 429/410, 429/434; 361/696, 697
See application file for complete search history.

(56) References Cited

U.S. PATENT DOCUMENTS

| 7,026,066 | B2 | 4/2006 | Ozeki et al. | |
| 7,097,763 | B2 * | 8/2006 | Takemoto et al. | 210/130 |
| 7,332,235 | B2 * | 2/2008 | Jeon et al. | 429/410 |
| 2006/0177713 | A1 * | 8/2006 | Tajima et al. | 429/26 |
| 2007/0003800 | A1 * | 1/2007 | Dallas et al. | 429/12 |

FOREIGN PATENT DOCUMENTS

| JP | 11-54139 | * | 2/1999 |
| JP | 2004192171 | | 7/2004 |
| JP | 2005183014 | | 7/2005 |

\* cited by examiner

*Primary Examiner* — Stephen J. Kalafut
(74) *Attorney, Agent, or Firm* — Blakely, Sokoloff, Taylor & Zafman LLP

(57) ABSTRACT

According to one embodiment, an electronic apparatus system includes an electronic apparatus and a fuel cell device which supplies electricity to the electronic apparatus. The electronic apparatus includes a housing, a heat generating component located in the housing, and a thermal radiation mechanism. The fuel cell device includes an electromotive section which has an anode and a cathode and generates the electricity based on a chemical reaction, a fuel tank containing a fuel, a circulation system which allows air and a fuel supplied from the fuel tank to circulate through the electromotive section, and a gas purifying filter arranged in the circulation system and having a catalyst section which decontaminates a gas component in an exhaust from the electromotive section. The gas purifying filter is located adjacent to the thermal radiation mechanism so as to be heatable by heat from the radiation mechanism.

18 Claims, 6 Drawing Sheets

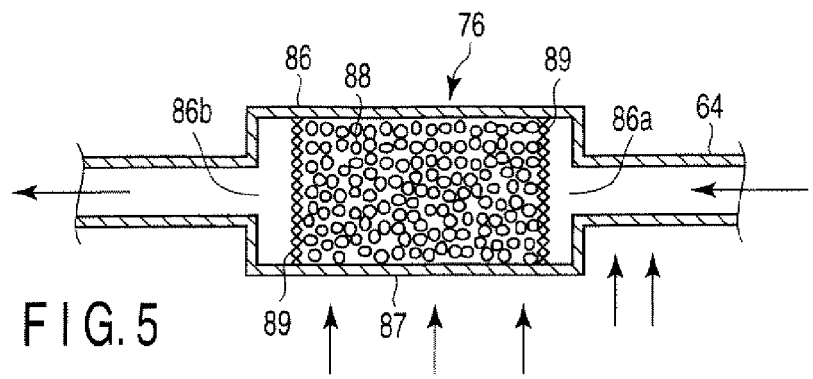
F I G. 5
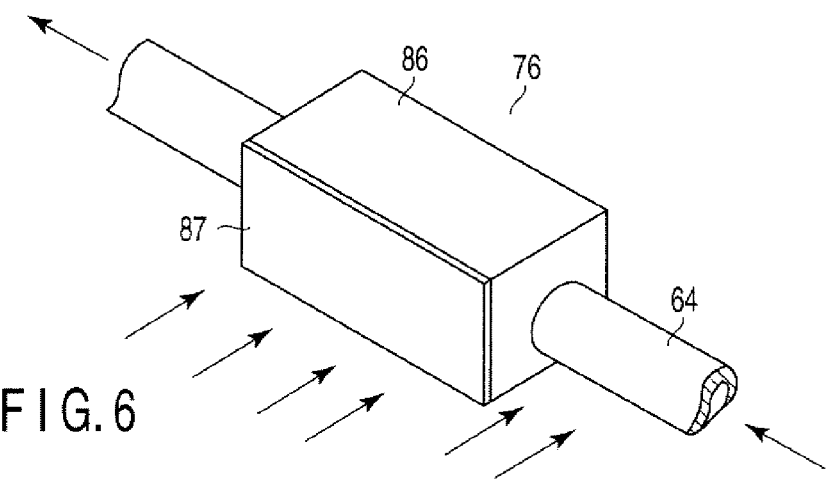
F I G. 6
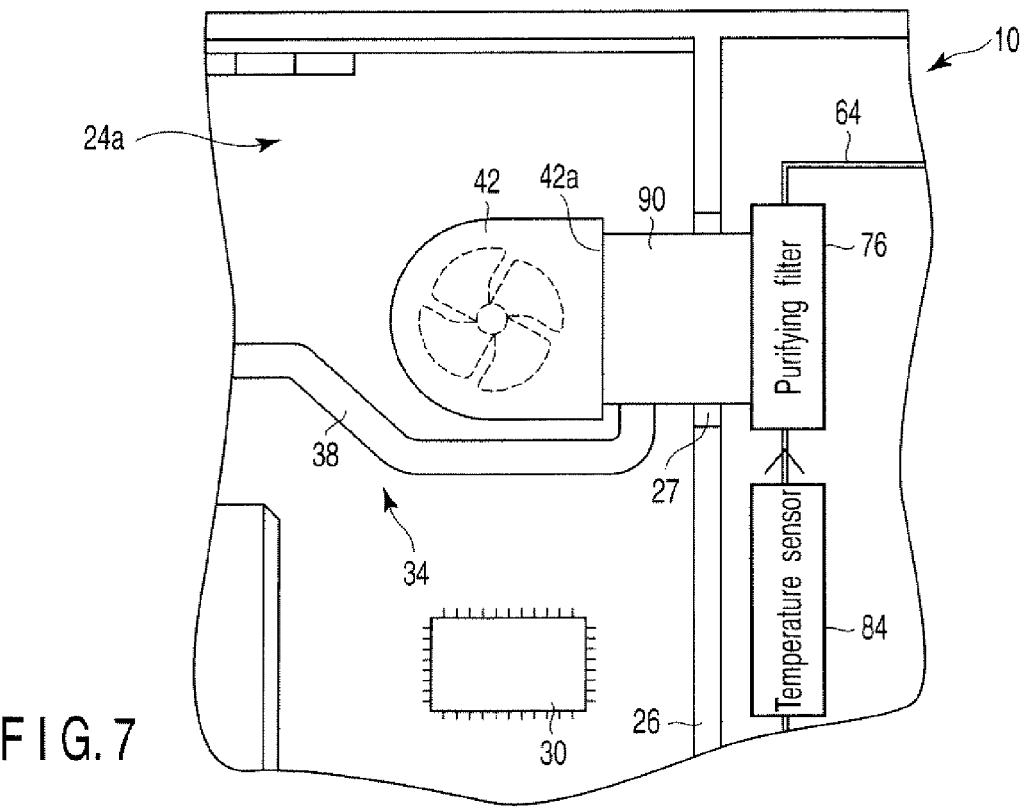
F I G. 7

ELECTRONIC APPARATUS SYSTEM

CROSS-REFERENCE TO RELATED APPLICATIONS

This application is based upon and claims the benefit of priority from Japanese Patent Application No. 2007-120099, filed Apr. 27, 2007, the entire contents of which are incorporated herein by reference.

BACKGROUND

1. Field

One embodiment of the present invention relates to an electronic apparatus system provided with an electronic apparatus and a fuel cell device for supplying current to the electronic apparatus.

2. Description of the Related Art

Presently, secondary batteries, such as lithium ion batteries, are mainly used as energy sources for portable notebook personal computers (notebook PCs), mobile devices, and other electronic devices. In recent years, small, high-output fuel cells that require no charging have been expected as new energy sources to meet the demands for increased energy consumption and prolonged use of these electronic devices with higher functions. There are various types of fuel cells. In a direct-methanol fuel cell (DMFC) that uses a methanol solution as its fuel, in particular, the fuel can be handled more easily than in a fuel cell that uses hydrogen, so that the system is simpler. Thus, the DMFC is a noticeable energy source for an electronic device.

Usually, a DMFC is provided with a fuel tank that contains methanol, a liquid pump for force-feeding the methanol into an electromotive section, an air pump for feeding air into the electromotive section, etc. The electromotive section is provided with a cell stack that is formed by stacking in layers a plurality of single cells each including an anode and a cathode. The methanol and air are supplied to the anode and the cathode, respectively, whereby electricity is generated based on a chemical reaction. As reaction products that are produced by the generation of electricity, unreacted methanol and carbon dioxide are produced on the anode side of the electromotive section, and water on the cathode side. The water as the reaction product is changed into steam and discharged.

According to a fuel cell electricity generating device described in Jpn. Pat. Appln. KOKAI Publication No. 2005-183014, for example, unreacted methanol and carbon dioxide produced on the anode side of an electromotive section are delivered to a gas-liquid separator, in which the methanol and carbon dioxide are separated. After the separation, a gas component is cleared of harmful substances by a purifying filter and then fed to a cathode channel through an exhaust passage.

Prevailing purifying filters for removing impurities in gas components utilize a catalytic reaction. The higher the temperature, the faster this catalytic reaction is accelerated, and the more the purification performance to remove impurities is improved.

In the fuel cell electricity generating device constructed in this manner, the purifying filter may possibly be heated to high temperature by a heat generating element, such as a heater, in order to accelerate the catalytic reaction of the filter. If the heater is an independent unit, however, it is not practical because of its high energy consumption and hinders the miniaturization of the fuel cell device.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 5 is an exemplary sectional view showing a gas purifying filter of the fuel cell device;

FIG. 6 is an exemplary perspective view showing the gas purifying filter;

FIG. 7 is an exemplary view showing a cooling mechanism section of a portable computer according to a modification of the invention;

DETAILED DESCRIPTION

Various embodiments according to the invention will be described hereinafter with reference to the accompanying drawings. In general, according to an embodiment of the invention, an electronic apparatus system comprises an electronic apparatus provided with a housing, a heat generating component located in the housing, and a thermal radiation mechanism which radiates heat from the heat generating component; and a fuel cell device which supplies the electricity to the electronic apparatus, the fuel cell device including an electromotive section which has an anode and a cathode and generates electricity based on a chemical reaction, a fuel tank containing a fuel, a circulation system which allows air and a fuel supplied from the fuel tank to circulate through the electromotive section, and a gas purifying filter arranged in the circulation system and having a catalyst section which decontaminates a gas component in an exhaust from the electromotive section; the gas purifying filter being located adjacent to the thermal radiation mechanism so as to be heatable by heat from the radiation mechanism.

Figure 1:
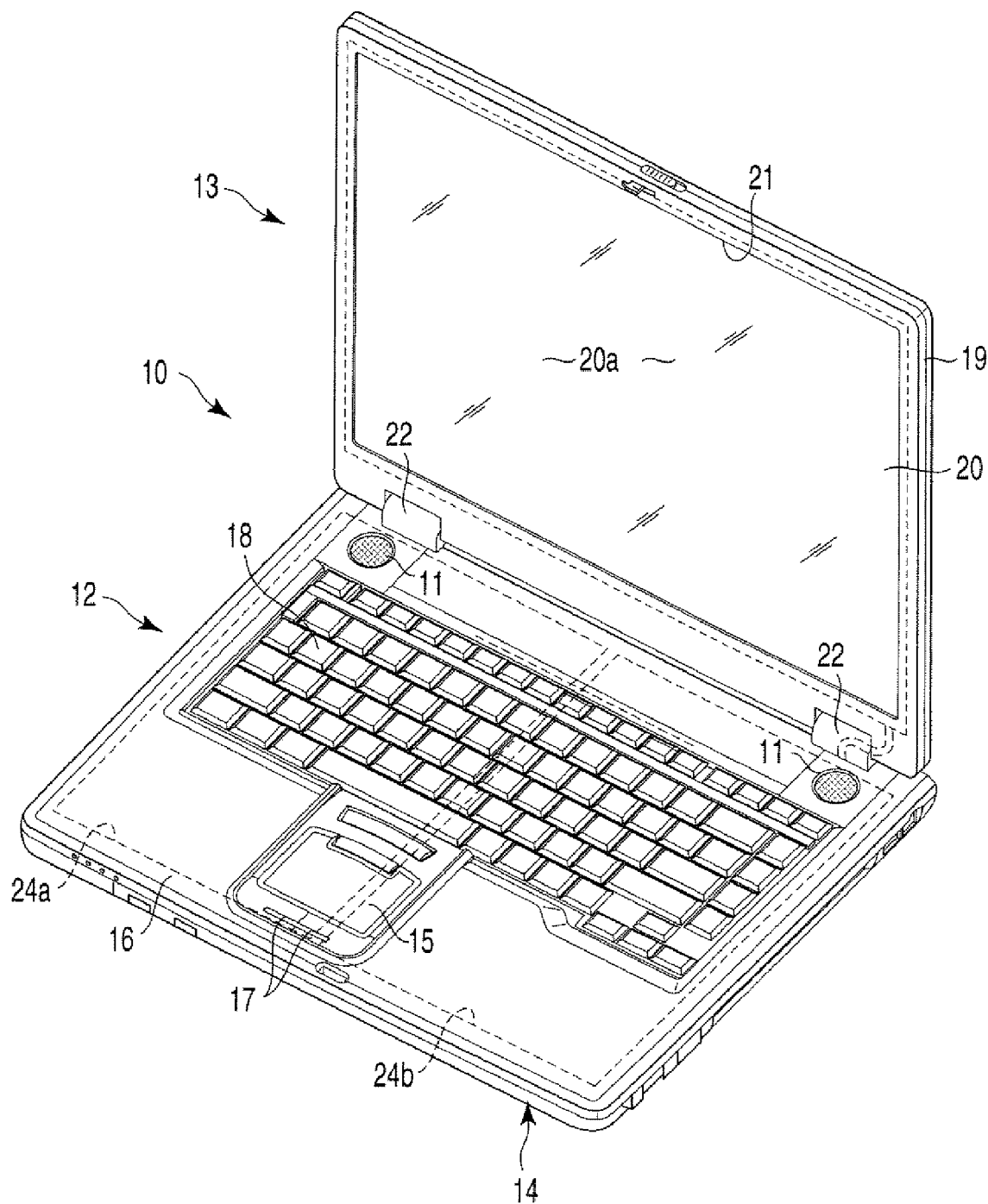
FIG. 1 is an exemplary perspective view showing a portable computer according to a first embodiment of the invention.
Figure 2:
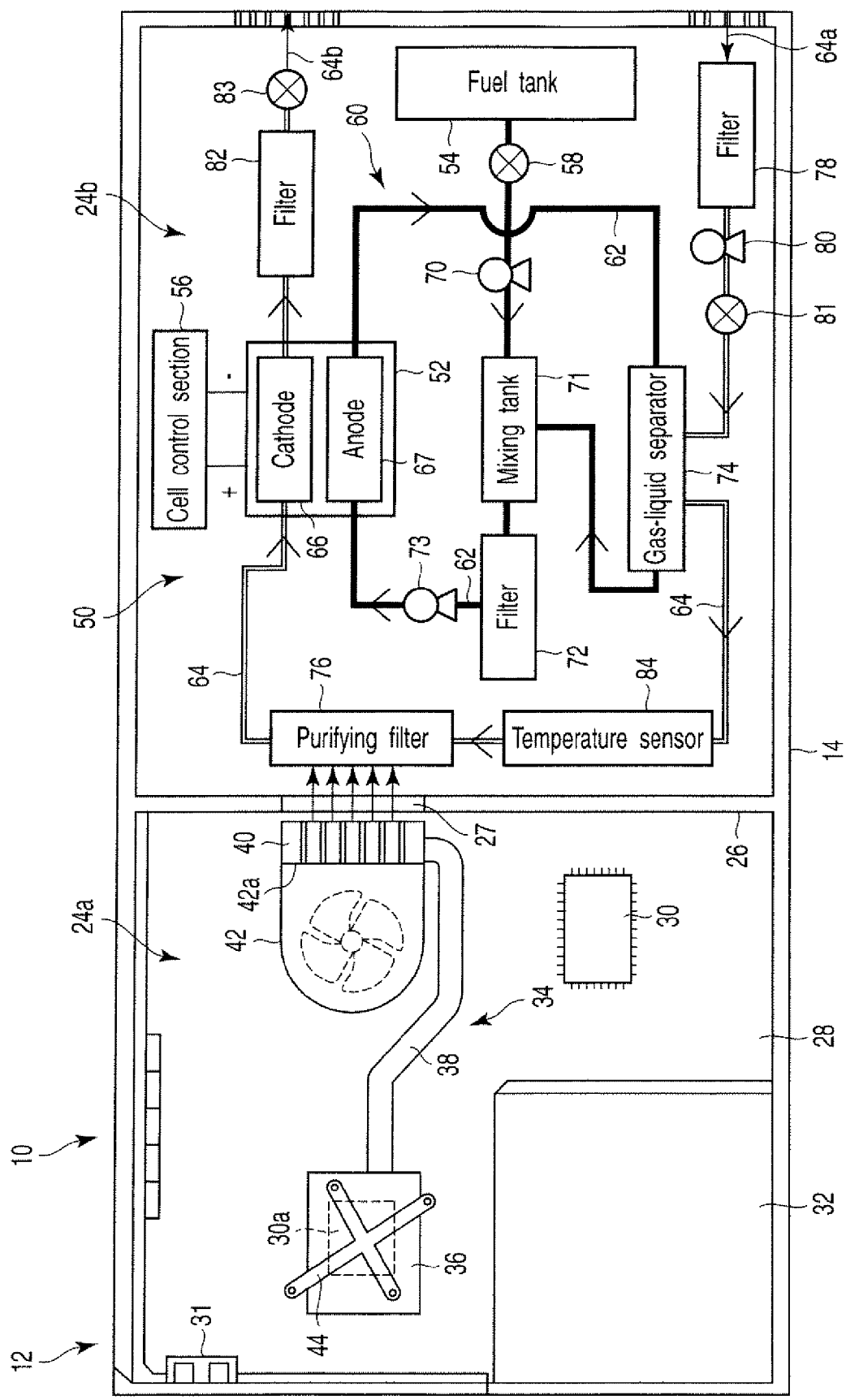
FIG. 2 is an exemplary diagram schematically showing the internal structure of the portable computer and a fuel cell device.

FIG. 1 shows a portable computer with a fuel cell device as an electronic apparatus system according to a first embodiment of the invention. FIG. 2 schematically shows the internal structure of the portable computer.

As shown in FIG. 1, a portable computer 10 is provided with an apparatus body 12 and a display unit 13 supported by the body 12. The apparatus body 12 includes a flat rectangular housing 14 that is formed of a synthetic resin, for example. A palm rest portion 16 is formed on the upper surface of the housing 14, and a touch pad 15 and a click button 17 are disposed substantially in the center of the palm rest portion 16. A keyboard 18 is located behind the palm rest portion 16.

Speakers 11 are exposed individually from the left- and right-hand sides of the rear end portion of the upper surface of the housing 14.

The display unit 13 is provided with a housing 19 in the form of a flat rectangular box and a liquid crystal display panel 20 in the housing. A screen 20a of the display panel 20 is exposed to the outside through a display window 21 that is formed in the housing 19. The housing 19 is rockably supported on the rear end portion of the housing 14 by a pair of hinge portions 22 on the rear end portion of the housing 14. Thus, the display unit 13 is rockable between a closed position in which it is brought down to cover the keyboard 18 from above and an open position in which it stands behind the keyboard.

As shown in FIGS. 1 and 2, the housing 14 has therein an electronic apparatus region 24a and a fuel cell region 24b, which are divided by a partition wall 26 in the housing. The regions 24a and 24b have substantially the same dimensions, for example, and are formed on opposite sides, left and right, of the partition wall 26.

Various component elements of the portable computer 10 as an electronic apparatus are arranged in the electronic apparatus region 24a. For example, the electronic apparatus region 24a is provided with a printed circuit board 28 that constitutes a mother board. Mounted on the printed circuit board 28 are various electronic components, such as semiconductor devices 30 including an MPU 30a, a modem board, a modem connector 31, a USB board, etc.

The electronic apparatus region 24a is provided with, for example, a DVD drive 32 for use as a storage device and a thermal radiation mechanism 34 for cooling the MPU 30a as a heat generating component. The thermal radiation mechanism 34 includes a radiator plate (heat block) 36, a heat pipe 38, radiator fins 40, and a cooling fan 42.

The radiator plate 36 is a substantially rectangular structure formed of a metal with high thermal conductivity, e.g., aluminum. The area of the plate 36 is larger enough than the plane area of the MPU 30a. The radiator plate 36 is lapped on the MPU 30a with a heat transfer sheet (not shown) therebetween and thermally connected to the MPU. The plate 36 is fixed to the printed circuit board 28 by a metallic leaf spring 44 and elastically pressed against the MPU 30a.

The radiator plate 36 is thermally connected to the radiator fins 40 by the heat pipe 38. The fins 40 are disposed adjacent and opposite to the partition wall 26 in the housing 14. An opening 27 is formed in that part of the wall 26 which faces the fins 40. Thus, the radiator fins 40 face the fuel cell region 24b through the opening 27. The cooling fan 42 is disposed on the opposite side of the fins 40 with respect to the opening 27, and its exhaust port 42a is disposed adjacent and opposite to the fins 40.

If the MPU 30a generates heat during the operation of the portable computer 10, the heat is received by the radiator plate 36. Thereupon, the MPU 30a is cooled. The heat of the plate 36 is transferred to the radiator fins 40 through the heat pipe 38. Further, the cooling fan 42 is actuated so that cooling air is blown against the fins 40 through the exhaust port 42a of the fan. Thus, the heat transferred to the fins 40 is radiated from the fins and delivered to the fuel cell region 24b through the opening 27.

As shown in FIG. 2, a fuel cell device 50 is located in the fuel cell region 24b. It is constructed as a DMFC that uses methanol as its fuel. The fuel cell device 50 is provided with a cell stack 52, a fuel tank 54, a circulation system 60, and a cell control section 56. The cell stack 52 constitutes an electromotive section. The circulation system 60 supplies a fuel and air to the cell stack 52. The cell control section 56 controls the entire operation of the fuel cell device.

The fuel tank 54 has a sealed structure and contains therein high-concentration methanol for use as a liquid fuel. The tank 54 may be formed as a fuel cartridge that can be attached to and detached from the fuel cell device 50.

The circulation system 60 includes an anode channel (fuel channel) 62, a cathode channel (air channel) 64, and a plurality of accessories. The fuel that is supplied from a fuel inlet of the fuel tank 54 and circulated through the cell stack 52 is run through the anode channel 62. A gas containing air that is circulated through the cell stack 52 is run through the cathode channel 64. The accessories are disposed in the anode and cathode channels. The anode and cathode channels 62 and 64 are each formed of a pipe line or the like.

Figure 3:
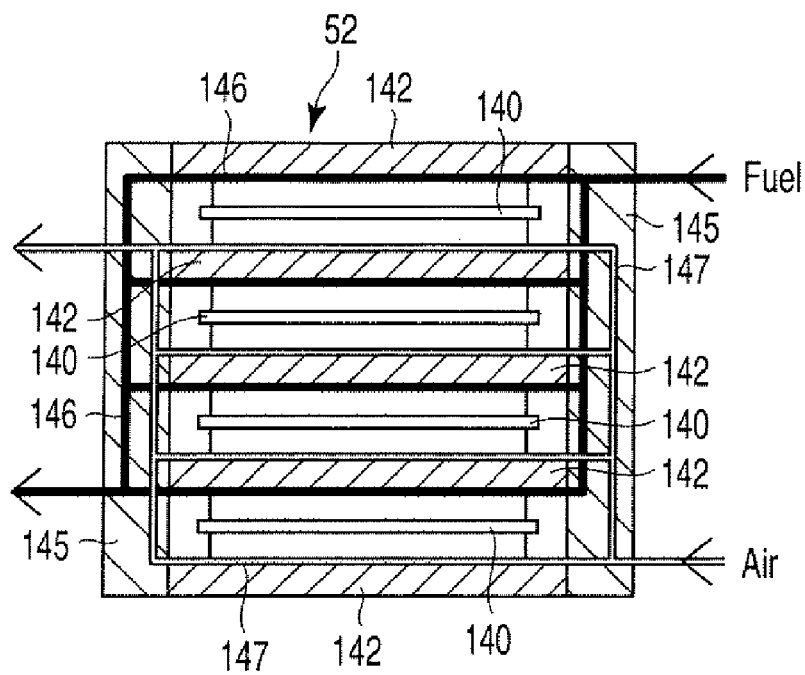
FIG. 3 is an exemplary sectional view showing a cell stack of the fuel cell device.
Figure 4:
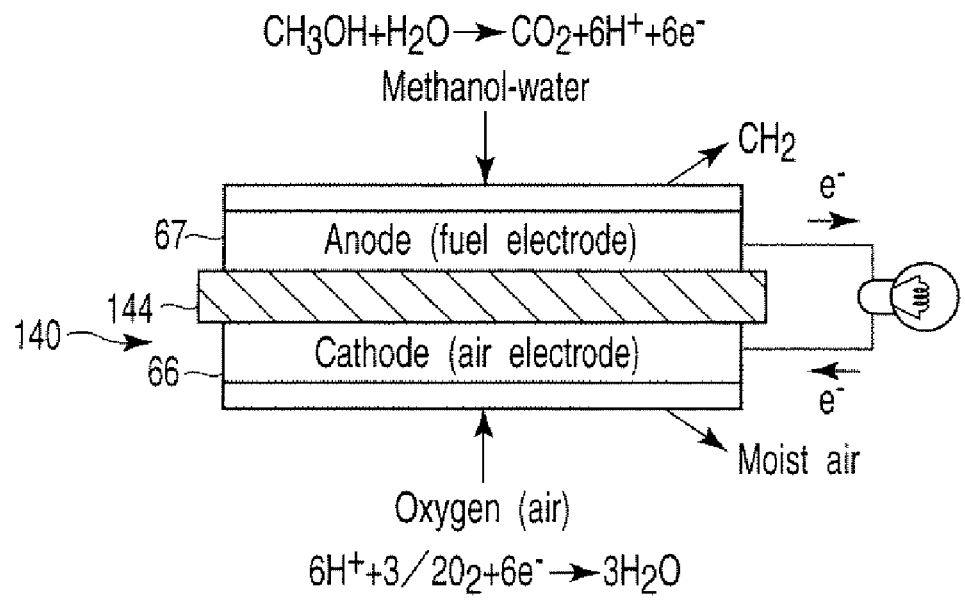
FIG. 4 is an exemplary view schematically showing a single cell of the fuel cell device.

FIG. 3 shows a laminate structure of the cell stack 52, and FIG. 4 schematically shows an electricity generating reaction of each cell. As shown in FIGS. 3 and 4, the cell stack 52 includes a laminate and a frame 145 that supports the laminate. The laminate is composed of a plurality of, e.g., four, single cells 140 and five separators 142 each in the form of a rectangular plate, which are alternately stacked in layers. Each single cell 140 is provided with a membrane-electrode assembly (MEA) that combines a cathode (air electrode) 66, an anode (fuel electrode) 67, and a substantially rectangular high-polymer electrolyte membrane 144 sandwiched between the cathode and the anode. The cathode 66 and the anode 67 are each in the form of a substantially rectangular plate that is composed of a catalyst layer and a carbon paper. The electrolyte membrane 144 is larger in area than the anode 67 and the cathode 66.

Three of the five separators 142 are stacked between two adjacent single cells 140, while the other two separators are individually stacked at the opposite ends in the direction of lamination. A fuel channel 146 and an air channel 147 are formed in the separators 142 and the frame 145. The fuel is supplied to the anode 67 of each single cell 140 through the fuel channel 146, while air is supplied to the cathode 66 of each single cell through the air channel 147.

As shown in FIG. 4, the supplied fuel and air chemically react with each other in the electrolyte membrane 144 between the anode 67 and the cathode 66, whereupon electricity is generated between the anode and the cathode. The electricity generated in the cell stack 52 is supplied to the portable computer 10 through the cell control section 56.

As shown in FIG. 2, the accessories in the anode channel 62 include an on-off valve 58 that is pipe-connected to the fuel inlet of the fuel tank 54, a fuel pump 70, and a mixing tank 71 connected to the output portion of the fuel pump by piping. Further, the accessories include a liquid pump 73 that is connected through a liquid filter 72 to the output portion of the mixing tank 71 that constitutes a part of the fuel tank 54. The output portion of the liquid pump 73 is connected to the fuel channel 146 of the cell stack 52 by the anode channel 62.

The output portion of the anode 67 of the cell stack 52 is connected to the input portion of the mixing tank 71 by the anode channel 62. The anode channel 62 is provided with a gas-liquid separator 74 between the output portion of the cell stack 52 and the mixing tank 71. An exhaust fluid discharged from the anode 67 of the cell stack 52, that is, a gas-liquid two-phase flow containing produced carbon dioxide and an unreacted aqueous methanol solution that is not used in the chemical reaction, is fed to the separator 74, whereupon the carbon dioxide is separated. The separated aqueous methanol solution is returned to the mixing tank 71 through the anode channel 62 and supplied again to the anode channel 62. The carbon dioxide separated by the separator 74 is fed to a gas purifying filter 76 (mentioned later) through the cathode channel 64.

An upstream end 64a and a downstream end 64b of the cathode channel 64 individually communicate with the outside air. The accessories in the cathode channel 64 include an air filter 78, an air pump 80, an on-off valve 81, an exhaust filter 82, and an on-off valve 83. The air filter 78 is disposed near the upstream end 64a of the cathode channel 64 on the upstream side of the cell stack 52. The air pump 80 is connected to the cathode channel 64 between the cell stack 52 and the air filter. The exhaust filter 82 is disposed near the downstream end 64b of the cathode channel 64 on the downstream side of the cell stack 52.

The air filter 78 captures and removes impurities in the air sucked into the cathode channel 64, such as dust, carbon dioxide, formic acid, fuel gas, methyl formate, etc. The exhaust filter 82 immunizes by-products in the gas that is discharged to the outside through the cathode channel 64 and captures a fuel gas or the like contained in an exhaust gas.

The gas-liquid separator 74 is connected to that part of the cathode channel 64 which is situated between the inlet side of the cell stack 52 and the on-off valve 83. Further, the cathode channel 64 is provided with a temperature sensor 84 and the gas purifying filter 76 between the separator 74 and the inlet side of the cell stack 52. The gas separated from the liquid by the separator 74 and fed to the cathode channel 64 flows through the filter 76, in which it is cleared of impurities, such as the fuel gas, and harmful substances. Thereafter, the gas is delivered to the cell stack 52.

The following is a detailed description of the gas purifying filter 76.

As shown in FIGS. 5 and 6, the gas purifying filter 76 includes a case 86 of, for example, a synthetic resin or the like in the form of a square tube. An inlet 86a that is connected to the cathode channel 64 formed at one longitudinal end of the case 86, while an outlet 86b that communicates with the cathode channel is formed at the other end. A catalyst section 88 is housed in the case 86 so as to be situated between the inlet 86a and the outlet 86b. The catalyst section 88 is formed of a noble metal catalyst, e.g., platinum powder. The platinum powder is held in the case 86 by a breathable mesh 89.

In the fuel cell region 24b of the housing 14, as shown in FIG. 2, the gas purifying filter 76 is located adjacent and opposite to the opening 27 of the partition wall 26, and faces the radiator fins 40 on the side of the electronic apparatus region 24a. A wall portion 87 of the case 86 that faces the opening 27 may be formed of a metal with high thermal conductivity, such as aluminum.

Heat that is radiated from the radiator fins 40 while the portable computer 10 and the fuel cell device 50 are operating is delivered to the fuel cell region 24b through the opening 27 by the cooling fan 42. Then, the heat is blown on the case 86, especially the wall portion 87, of the gas purifying filter 76 and an inlet end portion of the cathode channel 64 that is connected to the inlet 86a of the case. Thereupon, the case 86 and the inlet end portion of the cathode channel 64 are heated, so that the catalyst section 88 in the case and the gas that flows into the catalyst section are heated. If the heating temperature of the MPU 30a is 80° C., the catalyst section 88 is heated to 45° C. or more (60° C. or more in this case) and kept at high temperature. Thus, by heating the gas purifying filter 76 to high temperature, a catalytic reaction of the catalyst section is accelerated, so that high gas purification performance can be fulfilled.

If the portable computer 10 is operated with use of the fuel cell device 50 constructed in this manner as an energy source, the fuel pump 70, liquid pump 73, and air pump 80 are actuated and the on-off valves 58, 81 and 83 are opened, under the control of the cell control section 56. Methanol is supplied from the fuel tank 54 to the mixing tank 71 by the fuel pump 70 and mixed with water to form an aqueous methanol solution with a desired concentration in the mixing tank. Further, the aqueous methanol solution in the mixing tank 71 is supplied to the anode 67 of the cell stack 52 through the anode channel 62 by the liquid pump 73.

On the other hand, air or the outside air is sucked into the cathode channel 64 through its upstream end 64a by the air pump 80. The air flows through the air filter 78, whereby it is cleared of dust and impurities. After having passed through the air filter 78, the air is delivered to the gas-liquid separator 74 through the cathode channel 64. Further, the air, along with an exhaust gas from the cell stack 52 separated by the separator 74, is fed to the gas purifying filter 76 and decontaminated thereby. Thereafter, the decontaminated air is supplied to the cathode 66 of the cell stack 52.

The methanol and air supplied to the cell stack 52 electrochemically react with each other in the electrolyte membrane 144 between the anode 67 and the cathode 66, whereupon electricity is generated between the anode and the cathode. The electricity generated in the cell stack 52 is supplied to the portable computer body through the cell control section 56.

With the progress of the electrochemical reaction, carbon dioxide and water are produced as reaction products on the sides of the anode 67 and the cathode 66, respectively. The carbon dioxide produced on the anode side and the unreacted aqueous methanol solution that is not used in the chemical reaction are fed to the gas-liquid separator 74 through the anode channel 62. Thereupon, the carbon dioxide and the aqueous methanol solution are separated from each other. The separated aqueous methanol solution is recovered from the separator 74 into the mixing tank 71 through the anode channel 62 and utilized again for the generation of electricity.

The separated carbon dioxide is delivered from the gas-liquid separator 74 to the cathode channel 64 and further fed together with air to the gas purifying filter 76. After impurities in the air and harmful substances, containing carbon dioxide, are removed, the air and the carbon dioxide are supplied to the cell stack 52 and used for the generation of electricity. The impurities in the air are prevented from being delivered to the cell stack 52, whereby the electricity generating efficiency can be prevented from being reduced by the impurities.

When this is done, as mentioned before, heat from the MPU 30a, as the heat generating component of the portable computer, is applied to the gas purifying filter 76 by the thermal radiation mechanism 34, whereby the filter is heated to high temperature to ensure high gas purification performance. Thus, impurity elements in the gas can be efficiently removed by the gas purifying filter 76.

Most of the water produced on the cathode 66 side of the cell stack 52 is changed into steam and discharged together with air into the cathode channel 64. The discharged air and steam are fed to the exhaust filter 82, in which dust and impurities are removed. Thereafter, the decontaminated air and steam are discharged to the outside through the downstream end 64b of the cathode channel 64. Here the interior of the housing 14 is divided into the electronic apparatus region 24a and the fuel cell region 24b by the partition wall 26. If steam is produced in the fuel cell region 24b, therefore, it can be prevented from reaching the electronic apparatus region 24a.

According to the portable computer constructed in this manner, the gas purifying filter of the fuel cell device can be heated to high temperature by utilizing the heat from the heat generating component on the electronic apparatus side as a heat source, and no independent heater or the like is expected to be used to heat the filter. Therefore, the purification performance of the gas purifying filter can be improved without increasing the energy consumption of the portable computer, so that impurity elements in an exhaust gas from the fuel cell can be removed with high efficiency. Thus, there may be obtained an electronic apparatus system that has a high electricity generating capacity and is improved in safety and reliability.

In the first embodiment described above, as shown in FIG. 7, the radiator fins of the thermal radiation mechanism 34 may be replaced with a radiator duct 90 for use as a heat transfer member that thermally connects the exhaust port 42a of the cooling fan 42 and the case 86 of the gas purifying filter 76. Also with this configuration, the filter 76 can be heated to high temperature to ensure efficient gas purification by utilizing the heat from the heat source in the electronic apparatus region.

Figure 8:
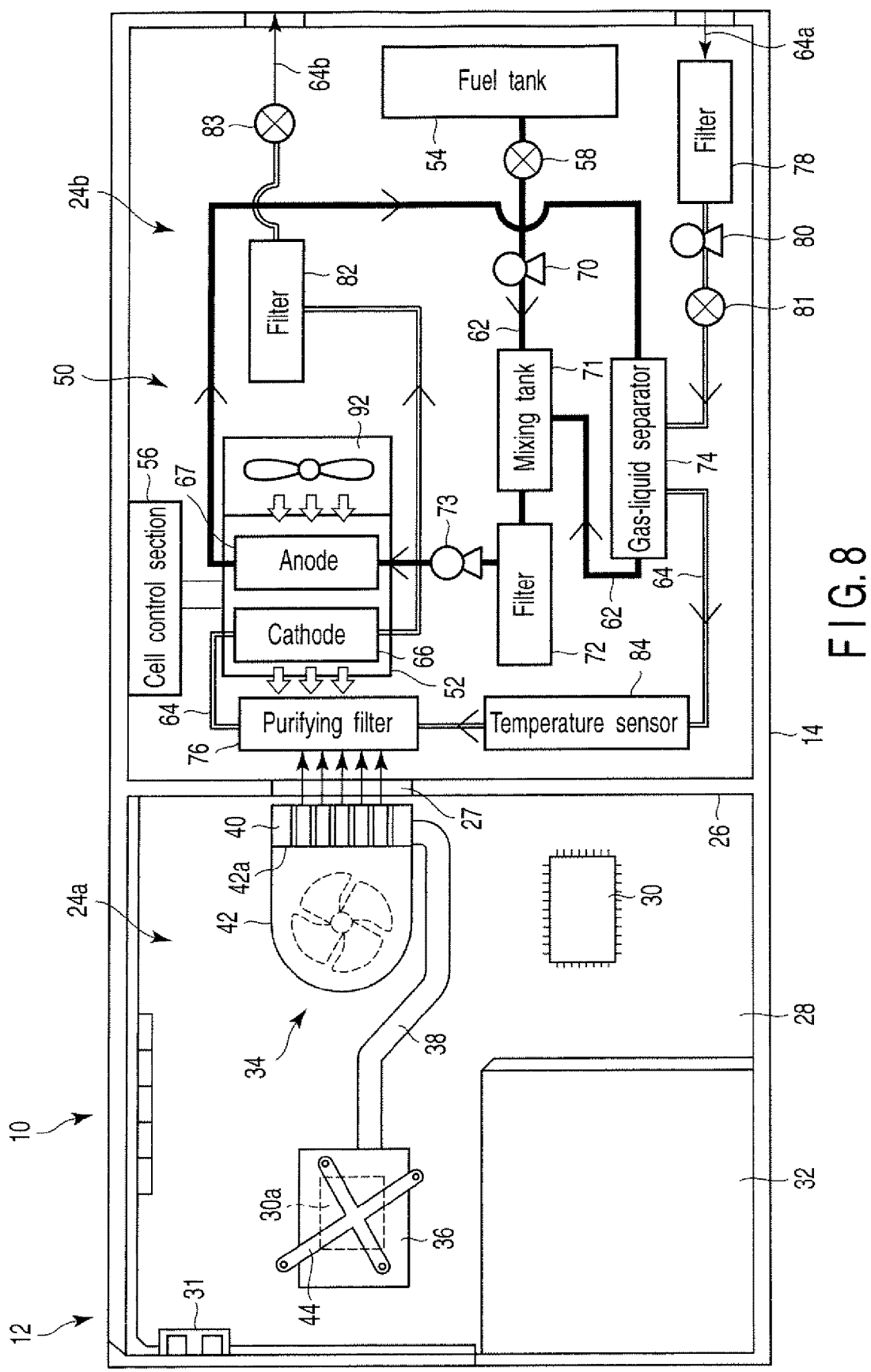
FIG. 8 is an exemplary diagram schematically showing the internal structure of a portable computer and a fuel cell device according to a second embodiment of the invention.

FIG. 8 schematically shows the internal structure of a portable computer according to a second embodiment of this invention. According to the second embodiment, as shown in FIG. 8, a cell stack 52 of a fuel cell device 50 is located adjacent to a gas purifying filter 76. In this case, the cell stack is disposed on the opposite side of the filter with respect to an opening of a partition wall 26. The filter 76 is situated between the cell stack 52 and radiator fins 40 of a thermal radiation mechanism 34 that is disposed on the side of an electronic apparatus region 24a.

The fuel cell device 50 is provided with a cell fan 92 that is opposed to an anode 67 of the cell stack 52. The fan 92 is disposed on the opposite side of the cell stack 52 with respect to the gas purifying filter 76. The fan 92 blows cooling air against the cell stack 52, thereby cooling the cell stack. As an electromotive operation is performed, the cell stack 52 generates heat and forms a heat generating element of about 50 to 70° C. The filter 76 is situated on the downstream side of the cooling air from the cell fan 92. Therefore, a flow of air that is heated by flowing around the cell stack 52 is blown against a case of the filter 76. Thus, the filter 76 is heated by exhaust heat from the cell stack 52. In order to increase the efficiency of heat radiation from the cell stack 52, moreover, the cell stack may be provided with a plurality of radiator fins.

Further, heat from an MPU 30a in the electronic apparatus region 24a is transferred to the radiator fins 40 by the thermal radiation mechanism 34. Heat radiated from the radiator fins are blown against the gas purifying filter 76 by a cooling fan 42. Thereupon, the filter 76 is heated to high temperature.

Other configurations of the second embodiment are the same as those of the foregoing first embodiment, so that like reference numerals are used to designate like portions of these embodiments, and a detailed description of those portions is omitted.

According to the second embodiment constructed in this manner, exhaust heat from a heat generating component of a portable computer and exhaust heat from the cell stack 52 of the fuel cell device 50 can be utilized to heat the gas purifying filter 76. In consequence, the filter 76 can be heated to higher temperature to ensure improved gas purification performance. Accordingly, impurity elements in an exhaust gas from the fuel cell can be removed with high efficiency. Thus, there may be obtained an electronic apparatus system that has a high electricity generating capacity and is improved in safety and reliability.

Figure 9:
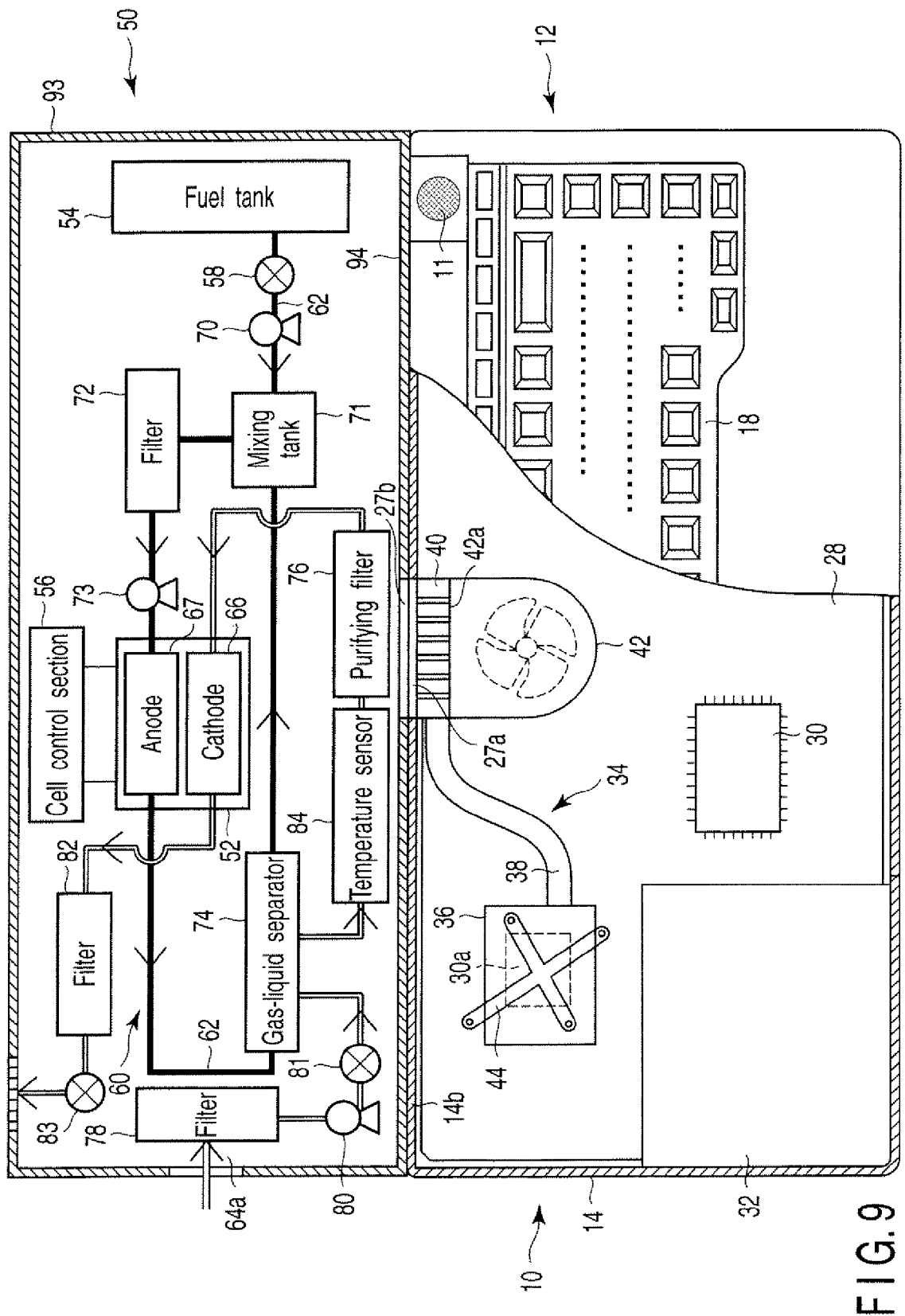
FIG. 9 is an exemplary diagram schematically showing the internal structure of a portable computer and a fuel cell device according to a third embodiment of the invention.

FIG. 9 shows an electronic apparatus system according to a third embodiment of this invention. As shown in FIG. 9, the electronic apparatus system is provided with a portable computer 10 and a fuel cell device 50 that supplies current to the portable computer. The fuel cell device 50 is disposed outside an apparatus body 12 of the portable computer 10 and is detachably connected to a rear part of a housing 14.

Various component elements of the portable computer 10 are arranged in the housing 14 of the apparatus body 12. Specifically, a printed circuit board 28 is disposed in the housing 14. Mounted on the printed circuit board 28 are various electronic components, such as semiconductor devices including an MPU 30a, a modem board, a modem connector, a USB board, etc. Further, the housing 14 contains therein, for example, a DVD drive 32 for use as a storage device and a thermal radiation mechanism 34 for cooling the MPU 30a as a heat generating component. The thermal radiation mechanism 34 includes a radiator plate 36, a heat pipe 38, radiator fins 40, and a cooling fan 42.

The radiator plate 36 is lapped on the MPU 30a with a heat transfer sheet (not shown) therebetween and thermally connected to the MPU. The plate 36 is fixed to the printed circuit board 28 by a metallic leaf spring 44 and elastically pressed against the MPU 30a. The plate 36 is thermally connected to the radiator fins 40 by the heat pipe 38. The fins 40 are disposed adjacent and opposite to a rear wall 14b of the housing 14. An opening 27a is formed in that part of the rear wall 14b which faces the fins 40. The cooling fan 42 is disposed on the opposite side of the fins 40 with respect to the opening 27a, and its exhaust port 42a is disposed adjacent and opposite to the fins 40.

If the MPU 30a generates heat during the operation of the portable computer 10, the heat is received by the radiator plate 36. Thereupon, the MPU 30a is cooled. The heat of the plate 36 is transferred to the radiator fins 40 through the heat pipe 38. Further, the cooling fan 42 is actuated so that cooling air is blown against the fins 40 through the exhaust port 42a of the fan. Thus, the heat transferred to the fins 40 is radiated from the fins and discharged through the opening 27a.

The fuel cell device 50 is constructed as a DMFC that uses methanol as its fuel. It is provided with a housing 93 in the form of a substantially rectangular box. The housing 93 contains therein a cell stack 52, a fuel tank 54, a circulation system 60, and a cell control section 56. The cell stack 52 constitutes an electromotive section. The circulation system 60 supplies a fuel and air to the cell stack 52. The cell control section 56 controls the entire operation of the fuel cell device. The cell stack 52 is formed by stacking in layers a plurality of single cells each including an anode 67, a cathode 66, and an electrolyte membrane (not shown).

The fuel tank 54 has a sealed structure and contains therein high-concentration methanol for use as a liquid fuel. The tank 54 may be formed as a fuel cartridge that can be attached to and detached from the fuel cell device 50.

The circulation system 60 includes an anode channel (fuel channel) 62, a cathode channel (air channel) 64, and a plurality of accessories. The fuel that is supplied from a fuel inlet of the fuel tank 54 and circulated through the cell stack 52 is run through the anode channel 62. A gas containing air that is circulated through the cell stack 52 is run through the cathode channel 64. The accessories are disposed in the anode and cathode channels. The anode and cathode channels 62 and 64 are each formed of a pipe line or the like.

The accessories in the anode channel 62 include an on-off valve 58 that is pipe-connected to the fuel inlet of the fuel tank 54, a fuel pump 70, and a mixing tank 71 connected to the output portion of the fuel pump by piping. Further, the accessories include a liquid pump 73 that is connected through a liquid filter 72 to the output portion of the mixing tank 71 that constitutes a part of the fuel tank 54. The output portion of the liquid pump 73 is connected to the fuel channel 146 of the cell stack 52 by the anode channel 62.

The output portion of the anode 67 of the cell stack 52 is connected to the input portion of the mixing tank 71 by the anode channel 62. The anode channel 62 is provided with a gas-liquid separator 74 between the output portion of the cell stack 52 and the mixing tank 71. An exhaust fluid discharged from the anode 67 of the cell stack 52, that is, a gas-liquid two-phase flow containing produced carbon dioxide and an unreacted aqueous methanol solution that is not used in the chemical reaction, is fed to the separator 74, whereupon the carbon dioxide is separated. The separated aqueous methanol solution is returned to the mixing tank 71 through the anode channel 62 and supplied again to the anode channel 62. The carbon dioxide separated by the separator 74 is fed to a gas purifying filter 76 (mentioned later) through the cathode channel 64.

An upstream end 64a and a downstream end 64b of the cathode channel 64 individually communicate with the outside air. The accessories in the cathode channel 64 include an air filter 78, an air pump 80, an on-off valve 81, an exhaust filter 82, and an on-off valve 83. The air filter 78 is disposed near the upstream end 64a of the cathode channel 64 on the upstream side of the cell stack 52. The air pump 80 is connected to the cathode channel 64 between the cell stack 52 and the air filter. The exhaust filter 82 is disposed near the downstream end 64b of the cathode channel 64 on the downstream side of the cell stack 52.

The air filter 78 captures and removes impurities in the air sucked into the cathode channel 64, such as dust, carbon dioxide, formic acid, fuel gas, methyl formate, etc. The exhaust filter 82 immunizes by-products in the gas that is discharged to the outside through the cathode channel 64 and captures a fuel gas or the like contained in an exhaust gas.

The gas-liquid separator 74 is connected to that part of the cathode channel 64 which is situated between the inlet side of the cell stack 52 and the on-off valve 83. Further, the cathode channel 64 is provided with a temperature sensor 84 and the gas purifying filter 76 between the separator 74 and the inlet side of the cell stack 52. The gas separated from the liquid by the separator 74 and fed to the cathode channel 64 flows through the filter 76, in which it is cleared of impurities, such as the fuel gas, and harmful substances. Thereafter, the gas is delivered to the cell stack 52.

The gas purifying filter 76, like the one according to the first embodiment, includes a case of, for example, a synthetic resin or the like in the form of a square tube, and a catalyst section housed in the case. The catalyst section is formed of a noble metal catalyst, e.g., platinum powder. In the housing 93, the filter 76 is disposed adjacent to a sidewall 94 of the housing. An opening 27b is formed in that part of the sidewall 94 which faces the filter 76.

The fuel cell device 50 constructed in this manner is detachably connected to the housing 14 of the portable computer 10 and also electrically connected to the computer by means of a connector (not shown). When the fuel cell device 50 is connected to the portable computer 10, the sidewall 94 of the housing 93 is situated opposite the rear wall 14b of the housing 14 of the computer. The opening 27b of the housing 93 is located adjacent and opposite to the opening 27a in the housing 14 of the computer 10. Thus, the gas purifying filter 76 faces the radiator fins 40 of the computer 10 through the openings 27a and 27b and is situated on the downstream side of the cooling fan 42 with respect to its air blowing direction.

Heat that is radiated from the radiator fins 40 while the portable computer 10 and the fuel cell device 50 are operating is delivered to the fuel cell device through the openings 27a and 27b by the cooling fan 42. Then, the heat is blown on the case of the gas purifying filter 76 and an inlet end portion of the cathode channel that is connected to an inlet of the case. Thereupon, the case or the inlet end portion of the cathode channel or both are heated, so that the catalyst section in the case and the gas that flows into the catalyst section are heated. If the heating temperature of the MPU 30a is 80° C., the catalyst section is heated to 45° C. or more (60° C. or more in this case) and kept at high temperature. Thus, by heating the filter 76 to high temperature, a catalytic reaction of the catalyst section is accelerated, so that high gas purification performance can be fulfilled.

Other configurations of the third embodiment are the same as those of the foregoing first embodiment, so that like reference numerals are used to designate like portions of these embodiments, and a detailed description of those portions is omitted.

According to the third embodiment constructed in this manner, the gas purifying filter of the fuel cell device can be heated to high temperature by utilizing the heat from the heat generating component on the electronic apparatus side as a heat source, and no independent heater or the like is expected to be used to heat the gas purifying filter. Therefore, the purification performance of the gas purifying filter can be improved without increasing the energy consumption, so that impurity elements in an exhaust gas from the fuel cell can be removed with high efficiency. Thus, there may be obtained an electronic apparatus system that has a high electricity generating capacity and is improved in safety and reliability.

While certain embodiments of the invention have been described, these embodiments have been presented by way of example only, and are not intended to limit the scope of the invention. Indeed, the novel methods and systems described herein may be embodied in a variety of forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, the electronic apparatus system may be applied to any other electronic apparatus than a portable computer. The heat generating member in the electronic apparatus is not limited to an MPU but may alternatively be a CPU, north bridge, graphic board, or any other member that generates high heat. The gas purifying filter may be heated by utilizing exhaust heat from the heat generating member. The fuel cell is not limited to the DMFC type but may of any other type, such as a polymer electrolyte fuel cell (PEFC).

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus system comprising:
   an electronic apparatus provided with a housing, a heat generating component located in the housing, and a thermal radiation mechanism which radiates heat from the heat generating component; and a fuel cell device which supplies the electricity to the electronic apparatus, the fuel cell device including an electromotive section which has an anode and a cathode and generates electricity based on a chemical reaction, a fuel tank containing a fuel, a circulation system which allows air and a fuel supplied from the fuel tank to circulate through the electromotive section, and a gas purifying filter arranged in the circulation system and having a catalyst section which decontaminates a gas component in an exhaust from the electromotive section;

the gas purifying filter being located adjacent to the thermal radiation mechanism so as to be heatable by heat from the radiation mechanism.

2. The electronic apparatus system according to claim 1, wherein the thermal radiation mechanism includes a cooling fan, and the gas purifying filter is on a downstream side of the cooling fan.

3. The electronic apparatus system according to claim 2, wherein the thermal radiation mechanism is provided with a radiator fin which is located between an exhaust side of the cooling fan and the gas purifying filter and radiates the heat from the heat generating component.

4. The electronic apparatus system according to claim 1, wherein the thermal radiation mechanism is provided with a heat transfer member thermally connected to the gas purifying filter.

5. The electronic apparatus system according to claim 1, wherein the fuel cell device includes a cell fan which blows cooling air against the electromotive section, and the gas purifying filter is located in a position such that the filter receives the cooling air having passed around the electromotive section.

6. The electronic apparatus system according to claim 1, wherein the housing of the electronic apparatus includes an electronic apparatus region in which the heat generating component and the thermal radiation mechanism are disposed, a fuel cell region in which the fuel cell device is disposed, and a partition wall which divides the electronic apparatus region and the fuel cell region, the partition wall having an opening situated between the thermal radiation mechanism and the gas purifying filter.

7. The electronic apparatus system according to claim 1, wherein the fuel cell device is detachably connected to the housing of the electronic apparatus.

8. The electronic apparatus system according to claim 1, wherein the gas purifying filter includes a case having an inlet and an outlet connected to the circulation system, and the catalyst section is located between the inlet and the outlet in the case, the gas purifying filter being located so that the case and/or the circulation system connected to the inlet is heatable by the heat from the thermal radiation mechanism.

9. The electronic apparatus system according to claim 8, wherein the case of the gas purifying filter includes a metallic wall portion which faces the thermal radiation mechanism.

10. An electronic apparatus system comprising:
an electronic apparatus comprising a housing, a heat generating component in the housing, and a thermal radiation mechanism configured to radiate heat from the heat generating component; and
a fuel cell device which supplies the electricity to the electronic apparatus, the fuel cell device comprising an electromotive section which includes an anode and a cathode and generates electricity based on a chemical reaction, a fuel tank containing a fuel, a circulation system which allows air and a fuel supplied from the fuel tank to circulate through the electromotive section, and a gas purifying filter in the circulation system comprising a catalyst section which decontaminates a gas component in an exhaust from the electromotive section;

the gas purifying filter being located adjacent to the thermal radiation mechanism so as to be heatable by heat from the radiation mechanism.

11. The electronic apparatus system according to claim 10, wherein the thermal radiation mechanism comprises a cooling fan, and the gas purifying filter is on a downstream side of the cooling fan.

12. The electronic apparatus system according to claim 11, wherein the thermal radiation mechanism comprises a radiator fin which is located between an exhaust side of the cooling fan and the gas purifying filter and radiates the heat from the heat generating component.

13. The electronic apparatus system according to claim 10, wherein the thermal radiation mechanism comprises a heat transfer member thermally connected to the gas purifying filter.

14. The electronic apparatus system according to claim 10, wherein the fuel cell device comprises a cell fan which blows cooling air against the electromotive section, and the gas purifying filter is located in a position such that the filter receives the cooling air having passed around the electromotive section.

15. The electronic apparatus system according to claim 10, wherein the housing of the electronic apparatus comprises an electronic apparatus region in which the heat generating component and the thermal radiation mechanism are disposed, a fuel cell region in which the fuel cell device is disposed, and a partition wall which divides the electronic apparatus region and the fuel cell region, the partition wall having an opening situated between the thermal radiation mechanism and the gas purifying filter.

16. The electronic apparatus system according to claim 10, wherein the fuel cell device is detachably connected to the housing of the electronic apparatus.

17. The electronic apparatus system according to claim 10, wherein the gas purifying filter comprises a case having an inlet and an outlet connected to the circulation system, and the catalyst section is located between the inlet and the outlet in the case, the gas purifying filter being located so that the case and/or the circulation system connected to the inlet is heatable by the heat from the thermal radiation mechanism.

18. The electronic apparatus system according to claim 17, wherein the case of the gas purifying filter comprises a metallic wall portion which faces the thermal radiation mechanism.

* * * * *